United States Patent Office 3,242,305
Patented Mar. 22, 1966

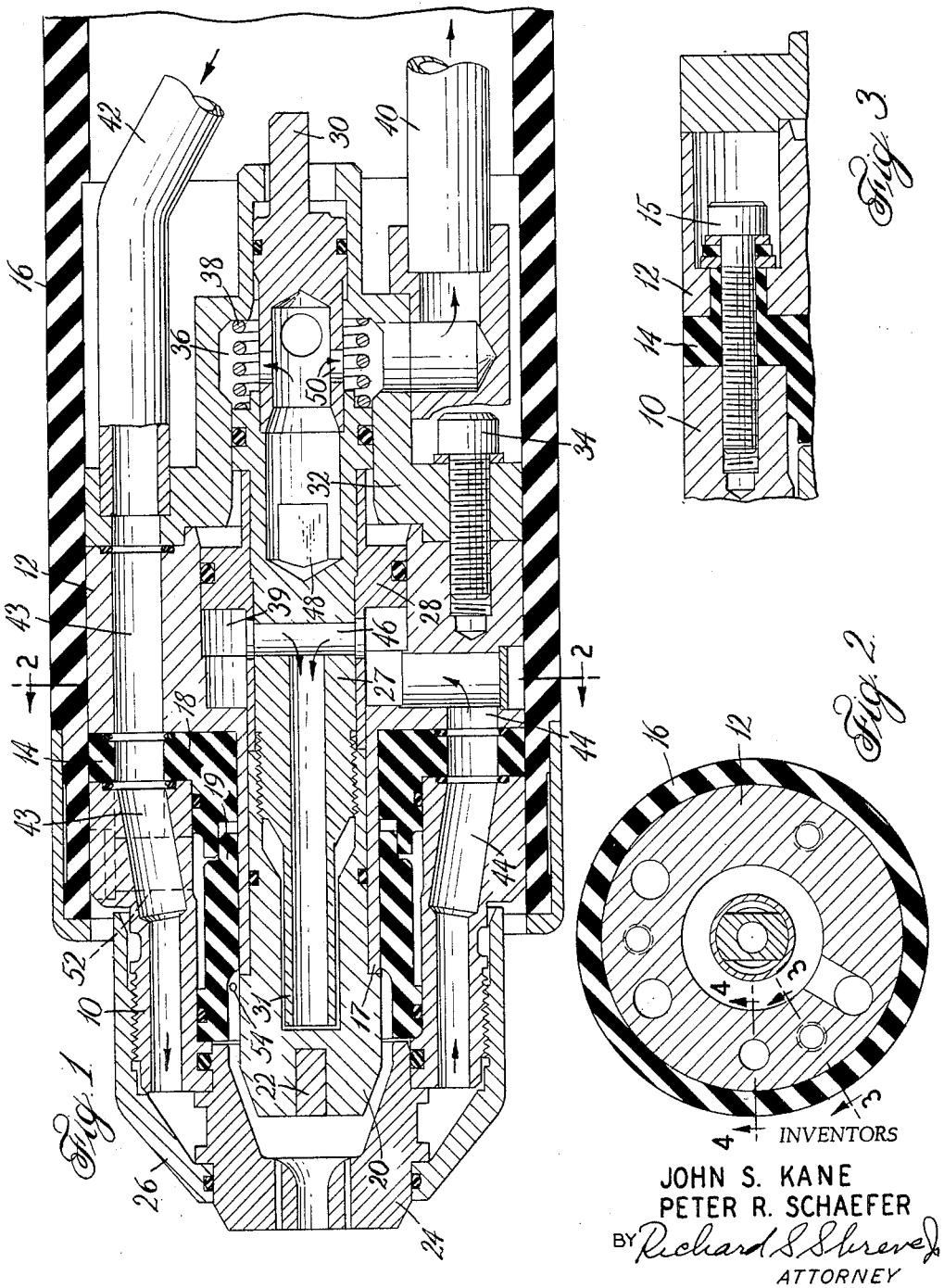

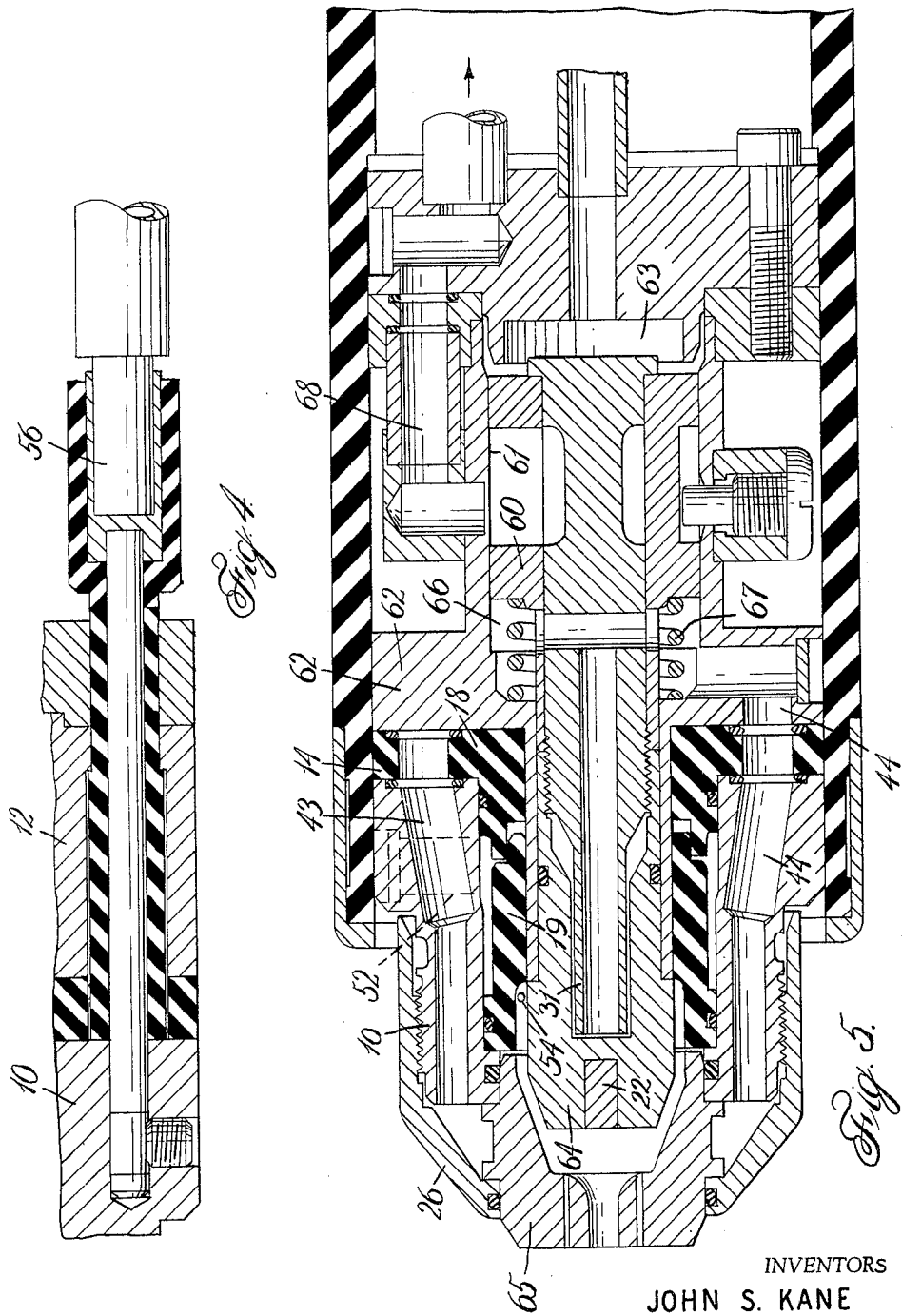

3,242,305
PRESSURE RETRACT ARC TORCH
John S. Kane, Watchung, and Peter R. Schaefer, Newark, N.J., assignors to Union Carbide Corporation, a corporation of New York
Filed July 3, 1963, Ser. No. 292,552
6 Claims. (Cl. 219—75)

This invention relates to pressure retract arc torches, and more particularly, to arc torches of the type provided with cooling water for the torch and gas for shielding the electrode, or for forming the arc plasma. Such torches are generally provided with a trigger and valves responsive to the trigger for turning on the cooling water and shielding gas flows simultaneously with turning on the electric current to the electrode.

In these torches, starting of an electric arc between an electrode and a workpiece has been a problem which heretofore has been solved by the use of high-frequency current. However, such high-frequency starting imposes severse electrical stresses upon insulating materials, resulting in short service life. Also, a high-frequency arc will travel a considerable distance, with the result that insulating spaces must provide an extremely long path to prevent arc over. Furthermore, high-frequency causes interference with radio communications, and high-frequency generators are expensive and not altogether reliable in power output.

The main object of the present invention is to provide a starting technique which will eliminate disadvantages of the use of high-frequency current. According to the present invention retract starting of the arc is accomplished by fluid pressure of one of the fluids supplied to the torch for its operation. The electrode is secured to a piston in a cylinder inside the torch, and in the preferred embodiment, the torch cooling water is supplied under pressure to the cylinder. Alternately, the cylinder is subjected to the pressure of the arc shielding gas on its way to the torch nozzle.

In the drawings:

FIGURE 1 is a vertical section through a torch according to the preferred embodiment of the present invention;

FIGURE 2 is a transverse section taken along the line 2—2 of FIG. 1;

FIGURE 3 is a partial vertical section taken along the line 3—3 of FIG. 2;

FIGURE 4 is a section taken along the line 4—4 of FIG. 2; and

FIGURE 5 is similar to FIG. 1 but showing a modification.

The torch has a barrel which comprises a front body 10 and a rear body 12, with an annular insulator 14 clamped therebetween by screws 15 as shown in FIG. 3, all covered by an insulating sheath 16.

The front body has an enlarged bore to receive a sleeve 17 depending from the rear body 12 inside the insulator 14. A ceramic insulator sleeve 19 surrounds the rear body sleeve 17 inside the front body 10 interfitting with a depending annular flange 18 of the insulator 14.

Slidably mounted in the depending sleeve 17 is an electrode 20 having an arcing tip 22. The lower end of the electrode is surrounded by an gas-directing nozzle 24 having an upper annular flange fitted with the front body 10. A hollow cap 26 is screwed onto the outside of the front body 10 to secure the nozzle 24 thereon.

The electrode 20 is axially bored to receive a lower hollow piston rod 27 of a piston 28 slidable in a cylinder 39 formed by a central bore in the rear body 12.

The lower portion of the rod 27 comprises a water baffle tube 31.

An upper piston rod 30 extends upward through a cylinder head 32, which is secured to the rear body 12 by screws 34. The cylinder head 32 has a water jacket 36 therein surrounding the upper piston rod 30 and containing a coil compression spring 38 of copper-coated steel wire between opposed shoulders on the jacket 36 and the upper rod 30.

Electric current is supplied to the cylinder head 32 through a water outlet tube 40 from the jacket 36. Cooling water is supplied by a tube 42 down through registering passages 43 in the front and rear bodies to the inside of cap 26.

From the cap 26 the cooling water passes up through similar registering passages 44 to the chamber 39 under the piston 28, thence through transverse bores 46 in the lower piston rod down through the baffle tube 31.

From the bottom of the electrode the cooling water flows upward through flats 48 on the outside of the baffle tube inside the piston 28 to the inside of the upper piston rod 30 and through transverse bores 50 therein into the water jacket 36 for discharge through the outlet tube 40.

Gas is supplied to the inside of the ceramic insulator sleeve 19 by a passage 52 having an outlet 54 through the wall thereof. Pilot arc current is supplied by a conductor 56, as shown in FIG. 4, which is connected to the front body 10.

In operation, the spring 38 holds the electrode 20 down against the nozzle 24. The cooling water is turned on simultaneously with the turning on of the electric current. The pressure of the cooling water in the chamber 39 pushes the piston 28 upwardly against the action of the spring 38, carrying the electrode 20 therewith, so that retraction of the tip 22 draws an arc between the tip and the nozzle 24. When the current is turned off, the flow of cooling water is also turned off so that the pressure thereof is returned and the spring 38 returns the electrode 20 to starting position.

A modified form of the invention shown in FIG. 5 utilizes gas pressure to urge the electrode towards the gas-directing nozzle and the compression spring and fluid pressure to return the electrode to its working position.

The piston 60 is slidably mounted in a bore 61 of rear body 62. Gas pressure supplied to chamber 63 acts upon the upper surface of the piston 60 to which is attached the electrode 64. This moves the piston 60 and electrode 64 towards the gas-directing nozzle 65. After the electrode 64 touches the nozzle 65, the gas pressure in chamber 63 is released. The cooling fluid then flows and exerts a pressure in chamber 66 and acts with spring 67 to retract the electrode 64. The water passes through the torch in a manner very similar to that shown in FIG. 1, and leaves the torch through passages 68.

What is claimed is:

1. Retract starting arc torch comprising a body having a chamber therein, a member extending transversely to said body in said chamber and responsive to pressure therein, an electrode carried by said member for movement longitudinally of said body, means for supplying electric current to said electrode, means in said body for urging said electrode downwardly, means for supplying fluid under pressure to said chamber, and means for constricting fluid flow away from said chamber to retain pressure under said responsive member to retract said electrode against said urging means.

2. Retract starting torch as claimed in claim 1, in which said chamber is a cylinder and said pressure responsive member is a piston slidable in said cylinder.

3. Retract starting torch as claimed in claim 1, in which said body has a second chamber, said pressure fluid is cooling water, and said urging means is a spring mounted in said second chamber supplied with said cooling water.

4. Plasma arc torch comprising a body having a chamber therein, a member responsive to pressure in said chamber, an electrode carried by said member, means for supplying electric current through said body to said electrode, a gas-directing nozzle below said electrode engaged thereby in lowered position, means for supplying gas through said body to said nozzle, means for supplying cooling water to said chamber, said body having a cooling water passage leading away from said chamber, said passage having a constricted portion to retain pressure under said pressure responsive member to move said electrode away from said nozzle.

5. Plasma arc torch as claimed in claim 4 in which said chamber is a cylinder, said responsive means is a piston slidable in said cylinder, said body has a cooling water jacket above said piston, and a spring in said cooling jacket urging said electrode down to engage said nozzle.

6. Plasma arc torch comprising a body, an electrode mounted in said body, a cooling chamber for said electrode, means for supplying electric current to said electrode, a gas-directing nozzle below said electrode, means for supplying gas under pressure to said nozzle, means actuated by the pressure of said gas for moving said electrode toward said nozzle, a spring in said cooling chamber urging said electrode away from said nozzle, and means for releasing said means for moving said electrode toward said nozzle.

References Cited by the Examiner

UNITED STATES PATENTS

| | | | |
|---|---|---|---|
| 2,683,791 | 7/1954 | Ruehlemann et al. | 219—127 X |
| 2,898,441 | 8/1959 | Reed et al. | 219—75 |
| 2,923,809 | 2/1960 | Clews et al. | 219—75 X |
| 3,004,189 | 10/1961 | Giannini. | |

RICHARD M. WOOD, *Primary Examiner.*

JOSEPH V. TRUHE, *Examiner.*